Aug. 10, 1937.   B. A. STIMMEL ET AL   2,089,306
METHOD AND APPARATUS FOR THE BURNING OF
MINERAL SULPHIDES IN GASEOUS SUSPENSION
Filed July 29, 1935

BYRON ANGUS STIMMEL.
KENNETH DUNCAN McBEAN.
GRAHAM CRUICKSHANK.
INVENTORS.

ATTORNEY

Patented Aug. 10, 1937

2,089,306

UNITED STATES PATENT OFFICE 2,089,306

METHOD AND APPARATUS FOR THE BURNING OF MINERAL SULPHIDES IN GASEOUS SUSPENSION

Byron Angus Stimmel, Kenneth Duncan McBean, and Graham Cruickshank, Trail, British Columbia, Canada, assignors to The Consolidated Mining & Smelting Company of Canada, Limited, Montreal, Quebec, Canada, a corporation of Canada Application July 29, 1935, Serial No. 33,652

7 Claims. (Cl. 75—9)

Our invention relates to an improved method and apparatus for the roasting of mineral sulphides in gaseous suspension, and is particularly directed toward effecting a positive control over the amount of sulphates and sulphur in the final product.

In our United States Patents 1,884,348 and 1,963,282 we disclosed a method and apparatus for roasting mineral sulphides of zinc, iron, copper and lead, either singly or in combination, in gaseous suspension, characterized in that the charge, in a finely divided state, is blown into the combustion chamber and is disseminated, concurrently with the air blast through it, for the exposure of each particle to the oxidizing action of the air. The roast is effected exclusively by the combustion of the sulphur content of the charge, supported by the air blast, for converting the sulphides into oxides, some sulphates and sulphur dioxide. The temperature and time period of the roast are regulated for promoting the oxidation of the charge without fusion or incipient fusion, and with the formation of a minimum amount of ferrates when treating zinc sulphides containing iron. The roasted material settling at the bottom of the combustion chamber is removed for further processing, and the gaseous products of combustion are evacuated from the combustion chamber having a high concentration of sulphur dioxide.

Among the principal features of our invention are the improvements correlated to the method and apparatus disclosed in the principal patents whereby we may effect at all times a positive control over the amount of sulphates and sulphur in the final product.

The type of roast to which mineral sulphides are subjected is largely dependent on the subsequent processes by means of which the metal is separated from its diluents and recovered. For example in roasting zinc sulphides to form zinc oxide for the subsequent leaching and electrolytic extraction of the zinc, it is generally economical to have sufficient soluble sulphur present with the products of combustion to supplement the acid for the losses occurring during the leaching and electrolyzing steps.

In the roasting of mineral sulphides for the manufacture of acid and/or one of the various reduction processes, however, it is not only desirable but necessary to obtain as complete elimination of sulphates and sulphur as possible for the economical and efficient operation of the subsequent processes.

It is also desirable in certain instances to obtain more than one product, each recoverable separately. An example of this is in the production of lithopone in conjunction with the separation and recovery of zinc by the retort process, wherein it is desirable in the production of lithopone to recover a highly soluble sulphate product, and in the preparation of the sulphides for the retort reduction process it is necessary to have as complete elimination of sulphur as possible.

In roasting in suspension, the burning hearth, which has a collecting hearth and rabbling device at its base, is maintained preferably within the temperature range of from 1650° to 1700° F. which precludes the formation and existence of metallic sulphates, such as zinc and iron, so that most of the metallic sulphates which are collected on or returned to this hearth would be decomposed to oxides. Any metallic oxide particles, however, which are carried out of the combustion chamber by the exit gases are subjected to the sulphatizing action of those gases and, depending on the temperature and the length of time before the particles are removed from the gases, form varying amounts of sulphates.

We have found that the operation of the process disclosed in the hereinbefore mentioned patents, and in fact any of the processes in which mineral sulphides are burned in gaseous suspension, is readily adaptable to a method for effecting a positive control over the amount of sulphates formed.

We have found also that if part or all the solid products of combustion from the furnace is rabbled in a sulphur dioxide atmosphere at a temperature below the decomposition temperature of the sulphates, preferably about 900° F. in the case of zinc sulphate, sulphatizing action takes place rapidly and, depending on the length of time the material is exposed to and the concentration of the sulphur dioxide in the gases, regulated amounts of sulphate sulphur may be formed in the roasted product, dependent on the subsequent processes for which the material is desired.

The manner in which we attain the objects of our invention is by the addition of one or more sulphating chambers located below the combustion chamber and communicating therewith in such a manner that all or any desired part of the oxide particles can be diverted to drop into the sulphating chamber and on to a settling hearth forming the lower part of the sulphating chamber whereon they are rabbled to expose each particle to the sulphatizing action of sulphur dioxide bearing gases, while the temperature of the sulphating chamber is maintained below the decomposition temperature of the sulphates formed. The sulphating chamber is also adapted to receive exit gases evacuated from the roasting chamber and evacuate the same for further processing or return them to the combustion chamber.

As a further feature we provide a system of conveyors whereby the dust particles separated from the evacuated gases in the various dust-collecting chambers may be returned to the combustion chamber to result in a product substantially free from sulphates and sulphur, or to the sulphating chamber to result in a highly soluble sulphate product, or eliminated from the process altogether. A further conveyor system is provided to carry away the products of the sulphating chamber.

A complete understanding of our invention may be had from the following description and accompanying drawing in which.

Figure 2:
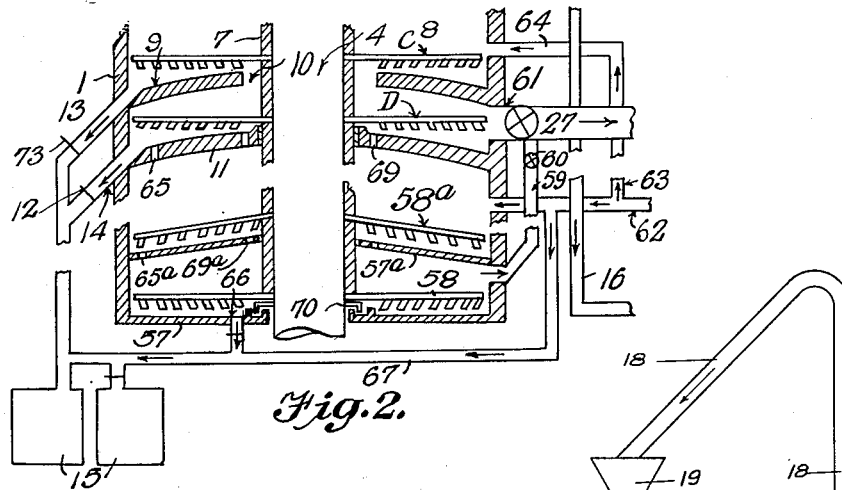
Fig. 2 is a vertical cross sectional view of the lower portion of the furnace when more than one sulphating chamber is used.
Figure 1:
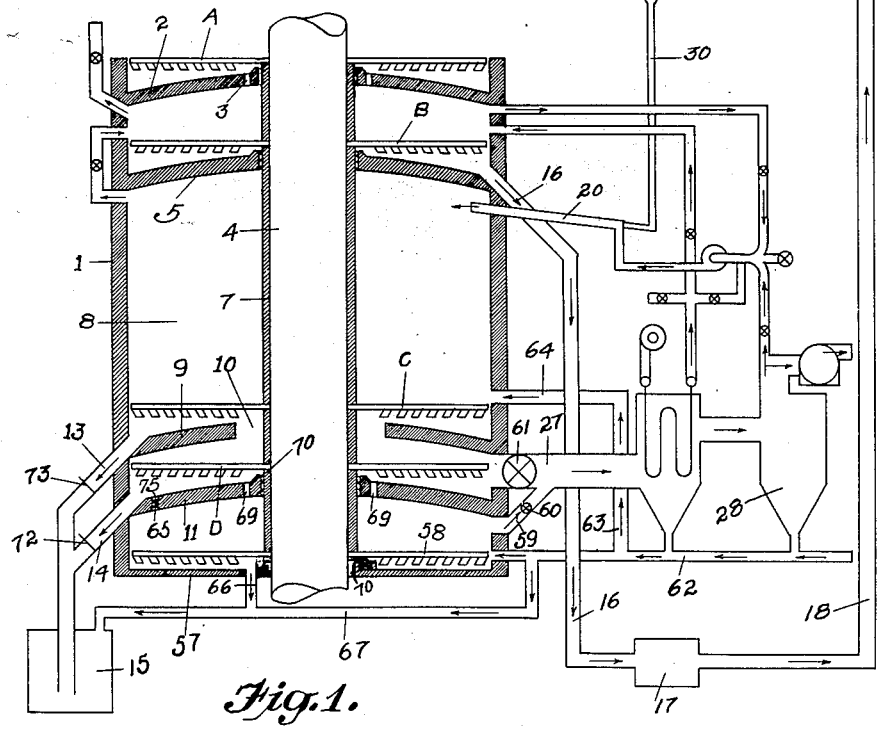
Fig. 1 is a vertical cross sectional view of the furnace, in which the associated parts suitable for carrying out our method are shown diagrammatically.

Referring to the drawing, in which like characters of reference refer to like parts throughout the specification and drawing, the preferred embodiment of our invention herein disclosed may be correlated with the method and apparatus disclosed in the principal Patents 1,884,348 and 1,963,282 respectively, it will only be necessary to refer to the principal parts of that apparatus in order to obtain a complete understanding of our improvement.

The shaft furnace 1 has drying hearths 2 and 5 located at the top, the drying hearth 2 communicating with the hearth 5 by means of the drop-holes 3 spaced at regular intervals about the vertical rotating shaft 4.

The combustion or roasting chamber 8 is of large cross sectional area and of relatively great depth, so proportioned that the finely divided mineral sulphides blown into the upper portions thereof have ample room for free dispersal throughout the chamber area for unimpeded downward movement therethrough in an oxidizing atmosphere to permit the complete oxidation of the mineral sulphides in gaseous suspension.

The settling hearth 9 at the bottom of the chamber 8 has a circular opening 10, forming an annular opening around the insulating casing 7 of the central shaft 4, which communicates with the hearth 11.

A conduit 16 communicates with the drying hearth 5 and the grinding mill or other suitable pulverizing apparatus 17. The conduit 18 communicates with the mill 17 and hopper 19. The conduit 30 communicates with the hopper 19 and the nozzle 20 through which the pulverized material is blown into the combustion chamber 8 concurrently with a blast of air.

Gas is evacuated from the combustion chamber and settling hearths through the gas conduit 21 and, after passing through suitable dust-collecting apparatus, is withdrawn from the process for subsequent treatment, or, if desired, part thereof may be returned to the combustion chamber to maintain the temperature of that chamber within the desired limits to prevent fusion or incipient fusion of the particles.

The conduits 13 and 14 communicate with the settling hearths 9 and 11 respectively and provide means for separately evacuating the roasted material settling on those hearths to the storage bin 15.

The vertical rotating shaft 4 has mounted thereon rabble arms A, B, C and D moving on the hearths 2, 5, 9 and 11 respectively, the rabbles being so adjusted as to rabble the particles towards and into the drop-hole 3 and conduits 16, 13 and 14 respectively.

Referring now to the parts relating to our improvement, we have added below the hearth 11 an additional hearth 57, and forming the sulphating chamber therebetween, preferably constructed of cast iron or steel, and having a lute ring 70 to seal the opening between the hearth and the insulating casing 7 of the shaft 4.

The hearth 11 communicates with the hearth 57 by means of the drop-hole 65, which is provided with the valve member 75, through which the roasted material may drop into the sulphating chamber and on to the hearth 57. Hot sulphur dioxide bearing gases are introduced into the sulphating chamber through the openings 69 spaced at regular intervals about the vertical rotating shaft 4.

Rabble arms 58 are secured to the rotating shaft 4, the rabbles being so positioned as to agitate the material on the hearth 57 to expose each particle to the sulphatizing action of the gas, and rabble the material from the periphery of the hearth to the drop-hole 66 through which it drops on to the conveyor 67, which conveys it to a suitable storage bin or to further treatment.

The opening 65 in the hearth 11 is provided with suitable adjustable closure means such as the valve 75 which, when adjusted in conjunction with the valves 72 and 73 provided in the conduits 14 and 13 respectively, all or any desired percentage of the material on the hearth 11 may be directed into the conduits 13 and 14 or on to the hearth 57.

The gas in the sulphating chamber is evacuated through the gas conduit 59 which is provided with a valve 60 to control the rate of evacuation. The gas conduit 59 communicates with the main gas conduit 27 which directs the flow of the gases into suitable dust-collecting chambers wherein the dust particles are separated from the gases.

The conveyor 62 which conveys the dust particles from the dust-collecting chambers to the hearth 57 also communicates with the elevator 63 and conveyor 64, whereby the dust may be returned to the combustion chamber rather than the sulphating chamber as desired. The conveyor 62 also communicates with the conveyor 67 by means of which the dust may be withdrawn entirely from the process.

The gas conduit 27 is further provided with a valve 61 located between the conduit 59 and the combustion chamber by means of which all or any desired percentage of the gaseous products of combustion may be directed from the combustion chamber through the openings 69 into the sulphating chamber.

The method of operating the process depends on the subsequent processes for which the final products are desired. For example in the treatment of zinc sulphides when the final product is desired for a zinc reduction or retort process, a grade of product is required which is low in sulphates and total sulphur. All the products collected in the flues, dust-collectors, etc., are returned to the hearth at the base of the combustion chamber 8 by way of the conveyor 62, the elevator 63 and the conveyor 64, being introduced into the combustion chamber on the periphery of the settling hearth 9. Here it quickly attains the prevailing temperature of from 1650°-1700° F. and, along with the material already collected on this hearth, is rabbled inwardly across the hearth with the result that the most important sulphates, such as those of zinc and iron, are rapidly decomposed into oxides, sulphur dioxide and oxygen. To ensure that this reaction will go to completion and to eliminate any residual sulphide or sulphate sulphur, the material is dropped through the opening 10 on to the hearth 11 where it is rabbled outwardly and discharged from the periphery into the conduit 14 substantially free of sulphates and sulphur.

During this operation the valve 75 in the drop-hole 65 is closed and the valve 72 leading into the conduit 14 is opened to permit the free evacuation of the roasted material from the process. The valve 60 in the gas conduit 59 is closed and the valve 61 in the main gas conduit 27 is opened wide to permit the free flow of the gaseous products of combustion from the combustion chamber.

The operation of the furnace is readily adaptable to produce a highly soluble sulphate product as required, for example, in the manufacture of lithopone or for the production of zinc sulphate. This product results from an easily executed regulation of the flow of the gases from the combustion chamber, together with the diversion of the products collected on the settling hearths 9 and 11. If the highest degree of sulphation is desired all the roasted products of the suspension burning, together with the flue dust collected in the various dust-collecting chambers, are introduced into the sulphating chamber through the drop-hole 65 in the hearth 11, the valves 72 and 73 in the conduits 14 and 13 being closed to prevent the flow of material therethrough and the valve 75 opened, and the flue dust by way of the conveyor 62. The material settles on the periphery of the hearth 57 and, by means of the rabbles secured to the rabble arms 58, is rabbled inwardly across the hearth toward and into the drop-hole 66, during which rabbling each particle is exposed to the sulphatizing action of the sulphur dioxide bearing gases from the combustion chamber introduced through the openings 69 of the hearth 11. By regulating the valve 60 in the gas conduit 59 and the valve 61 in the main gas conduit 27 a sufficient volume of gas is diverted into the sulphating chamber to maintain the temperature of that chamber within the range wherein the highest degree of sulphation will be effected. We prefer to maintain the temperature of the sulphating chamber about 900° although we do not wish to confine ourselves to that temperature.

Under these conditions, especially in the presence of iron in the form of ferric oxide which aids catalytically to form metallic sulphates, the material rapidly becomes sulphated and when the final product is finally discharged from the hearth through the drop-hole 66 on to the conveyor 67 it is in a highly sulphated condition and is an ideal product for further processing.

The above two examples illustrate the procedure followed to obtain a single product. We have found it possible in the operation of our method to obtain more than one product, each recoverable separately, ready for further separate processing. An example where two products are desired from one operation is in the preparation of zinc sulphides for reduction by the retort process wherein it is necessary that a minimum of sulphates and sulphur is present in the finished product, operated in conjunction with a process for the production of lithopone wherein it is desired that the highest possible percentage of sulphates is obtained in the final product. It will be apparent that each of these products must be recoverable separately.

Assuming that there are more than sufficient dust products recovered from the various dust-collecting chambers to produce the amount of sulphate sulphur required, sufficient dust is returned to the periphery of the hearth 57 by way of the conveyor 62. By regulating the valves 60 and 61 in the gas conduits 59 and 27 the necessary volume of gases is diverted from the combustion chamber to the sulphating chamber to maintain the temperature of that chamber within the desired limits. The material is rabbled inwardly across the hearth 57 finally reaching the drop-holes 66 to drop on to the conveyor 67 a highly sulphated product suitable for further processing.

The remainder of the dust products are diverted to the elevator 63 and conveyor 64 by means of which they are returned to the combustion chamber 8 on the periphery of the settling hearth 9. Here it is mixed with the other material settling on this hearth and is rabbled inwardly across the hearth to the opening 10 to drop on to the hearth 11, being finally discharged from the furnace through the conduit 14. During its progress across the hearths 9 and 11 the material is raised to the prevailing temperature, about 1700° F., at which temperature the metallic sulphates could not exist as such, and when discharged from the furnace is substantially free from sulphates and sulphur.

While this example illustrates the operation of the method to obtain two products when the amount of sulphate sulphur desired is less than the amount of flue dust available it will be apparent that should more sulphates be desired than there is flue dust available all the flue dust can be returned to the sulphating hearth 57 and any deficiency made up by diverting part of the roasted material from the hearth 11 through the drop-hole 65 by adjustment of the valve 75 and the valves 72 and 73 to result in any desired percentage of the roasted material being converted into sulphates, both sulphates and oxides being recoverable separately.

In the operation of our improved method we have found it possible to retain all the features of the principal method in that the roast is conducted exclusively by the combustion of the sulphur content of the charge without the use of extraneous fuel; the quick removal of the roasted products from the high temperature of the combustion chamber minimizes the formation of ferrates when the charge contains iron in addition to zinc; and fusion or incipient fusion is prevented by regulating the temperature of the combustion chamber.

In the operation of our process, it will be clearly understood, of course, that the temperature range within which the sulphating chamber is maintained is dependent on the type of charge being treated and the degree of sulphation desired and, in the case of zinc, while zinc sulphates will form at any temperature below say 1400° F. the decomposition temperature of zinc sulphate, we prefer to maintain the temperature about 900° F. above and below which the rate of sulphate formation decreases.

Similarly the number of sulphating chambers may be increased, as illustrated in Fig. 2 of the drawing to result in increased production from the furnace.

Referring to Fig. 2, additional sulphating hearths 57a forming sulphating chambers therebetween, are constructed in the lower portion of the furnace below the oxide settling hearths. Hot sulphur dioxide bearing gases are introduced into the sulphating chambers through the gas inlet ports 69, 69a and the sulphated particles are exposed to the sulphatizing action of the gases and passed progressively from one sulphating chamber to the next lower chamber by the action of the rabbles secured to the rotating rabble arms 58a moving the particles towards and into the drop holes 65a. The gases are evacuated from the sulphating chambers through the conduit 59. The volume of the gases admitted to and evacuated from the sulphating chambers being regulated by the valves 27 and 60 respectively. It will be apparent that variations in our process and apparatus may be made, such as illustrated above, without departing from the scope of our invention.

Having thus fully described our invention, what we claim as new and desire to secure by Letters Patent is:—

1. An improved apparatus for roasting mineral sulphides to effect a positive control over the amount of sulphates and sulphur in the final product which comprises a furnace having a combustion chamber of large cross sectional area to permit the thorough dispersal of finely divided particles, and of a depth sufficient to permit the oxidation of such particles in gaseous suspension; means for dispersing the particles with a regulated quantity of air in the upper part of the combustion chamber; a settling hearth in the lower part of the combustion chamber on which the suspended particles eventually settle and rabbling means for agitating said particles on the settling hearth; a main gas conduit communicating with the combustion chamber through which the gaseous products of combustion may be evacuated and a valve member in the conduit for controlling the rate of evacuation of the gases; dust-collecting means for separating the dust particles from the evacuated gases; a sulphating chamber in direct communication and contiguous with the combustion chamber and a sulphate settling hearth at the lower part of the sulphating chamber; means for diverting regulated amounts of the roasted product of the combustion chamber into the sulphating chamber to settle on the sulphate settling hearth; means for introducing regulated amounts of hot sulphur dioxide bearing gases into the sulphating chamber; conveying means for returning regulated amounts of the dust particles separated from the evacuated gases to the sulphating chamber; a conduit for evacuating the gases from the sulphating chamber; rabbling means for agitating the particles settling on the sulphate settling hearth and means for separately evacuating the sulphated product from the sulphating chamber.

2. An improved apparatus for roasting mineral sulphides to effect a positive control over the amount of sulphates and sulphur in the final product which comprises a furnace having a combustion chamber of large cross sectional area to permit the thorough dispersal of finely divided particles and of a depth sufficient to permit the oxidation of such particles in gaseous suspension; means for dispersing the particles with a regulated quantity of air in the upper part of the combustion chamber; a settling hearth in the lower part of the combustion chamber on which the suspended particles eventually settle and rabbling means for agitating said particles on the settling hearth; a main gas conduit communicating with the combustion chamber through which the gaseous products of combustion may be evacuated and a valve member for controlling the rate of such evacuation; dust-collecting means for separating the dust particles from the evacuated gases; a sulphating chamber in direct communication and contiguous with the combustion chamber and a sulphate settling hearth in the lower part of the sulphating chamber; means for introducing regulated amounts of the roasted product of the combustion chamber into the sulphating chamber to settle on the sulphate settling hearth; means for introducing regulated amounts of hot sulphur dioxide bearing gas formed in the combustion chamber by the combustion of the sulphur content of the charge into the sulphating chamber and thereby maintaining the temperature of that chamber within desired limits; conveying means for returning regulated amounts of the dust particles separated from the evacuated gases to the sulphating chamber; a gas conduit communicating with the sulphating chamber and the main gas conduit and a valve member to regulate the rate of the evacuation of the gases from the sulphating chamber therethrough; rabbling means to agitate and expose the particles on the sulphate settling hearth to the sulphatizing action of the sulphur dioxide bearing gas and means for separately evacuating the sulphated product.

3. In combination with a process for the roasting of mineral sulphides in gaseous suspension the method of separately evacuating the solid and gaseous products of the roasting step; separating the dust particles from the evacuated gases; introducing regulated amounts of the dust particles into a sulphating chamber in direct communication and contiguous with the roasting step wherein they are exposed to the sulphatizing action of hot sulphur dioxide bearing gases; maintaining the temperature of the sulphating chamber below the decomposition temperature of the sulphates formed and separately evacuating the sulphated product and the sulphur dioxide bearing gas.

4. In combination with apparatus for the roasting of mineral sulphides in gaseous suspension, a sulphating chamber in direct communication and continguous with the roasting chamber and having a settling hearth at the lower part thereof; means for introducing regulated amounts of hot sulphur dioxide bearing gas into the sulphating chamber; means for introducing regulated amounts of the roasted particles into the sulphating chamber to settle on the settling hearth; means for agitating the settled particles; means for controlling the temperature of the sulphating chamber below the decomposition temperature of the sulphates formed; and means for separately evacuating the sulphated product and the sulphur dioxide bearing gas.

5. In combination with apparatus for the roasting of mineral sulphides in gaseous suspension, means for separately evacuating the solid and gaseous products of the roasting chamber; dust-collecting means for separating the dust particles from the evacuated gases; a sulphating chamber having a settling hearth at the lower part thereof, said sulphating chamber in direct communication and contiguous with the roasting chamber of the roasting apparatus; conveying means for introducing regulated amounts of the dust particles into the sulphating chamber to settle on the settling hearth; means for introducing regulated amounts of hot sulphur dioxide bearing gases from the roasting chamber into the sulphating chamber; rabbling means for agitating the particles on the said settling hearth; means for controlling the temperature of the sulphating chamber below the decomposition temperature of the sulphates formed; and means for separately evacuating the sulphated product and the sulphur dioxide gas.

6. In combination with apparatus for the roasting of mineral sulphides in gaseous suspension, means for separately evacuating the solid and gaseous products of the roasting chamber; dust-collecting means for separating the dust particles from the evacuated gases; a sulphating chamber having a settling hearth at the lower part thereof, said sulphating chamber in direct communication and contiguous with the roasting chamber of the roasting apparatus; means for introducing regulated amounts of the solid products of the combustion chamber into the sulphating chamber to settle on the settling hearth thereof; conduit means for introducing regulated amounts of hot sulphur dioxide bearing gas from the roasting chamber into the sulphating chamber; rabbling means for agitating the particles on the said sulphate settling hearth; means for controlling the temperature of the sulphating chamber below the decomposition temperature of the sulphates formed; and means for separately evacuating the sulphated product and the sulphur dioxide bearing gas.

7. In combination with a process for the roasting of mineral sulphides in gaseous suspension the method of separately evacuating the solid and gaseous products of the roasting step; separating the dust particles from the evacuated gases; introducing regulated amounts of the dust particles into a sulphating step in direct communication and contiguous with the roasting step of the process wherein they are exposed to the sulphatizing action of sulphur dioxide bearing gas; maintaining the temperature of the sulphating step below the decomposition temperature of the sulphates formed by directing into the sulphating step regulated amounts of hot sulphur dioxide bearing gas from the combustion step and separately evacuating the sulphated product and the sulphur dioxide bearing gas.

BYRON ANGUS STIMMEL.
KENNETH DUNCAN McBEAN.
GRAHAM CRUICKSHANK.